April 2, 1940.                A. J. N. DUCLOS                2,195,562
                        SPEED INDICATING APPARATUS
                          Filed Nov. 5, 1937            2 Sheets-Sheet 1
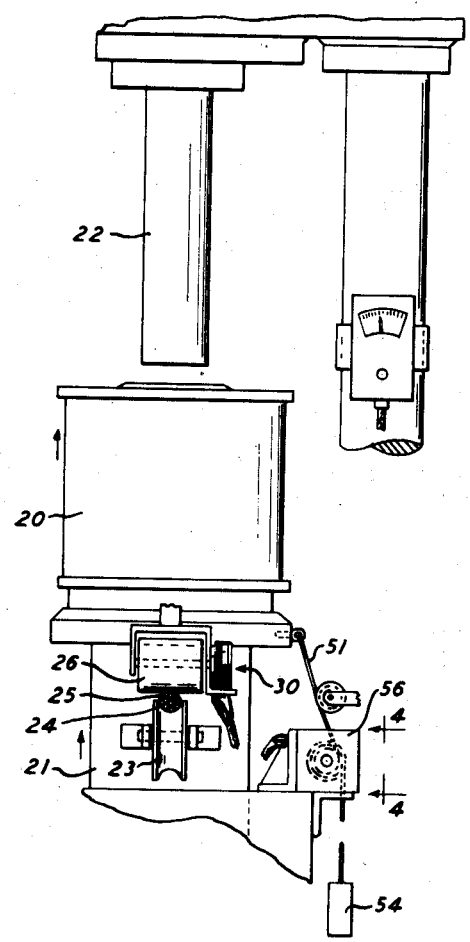
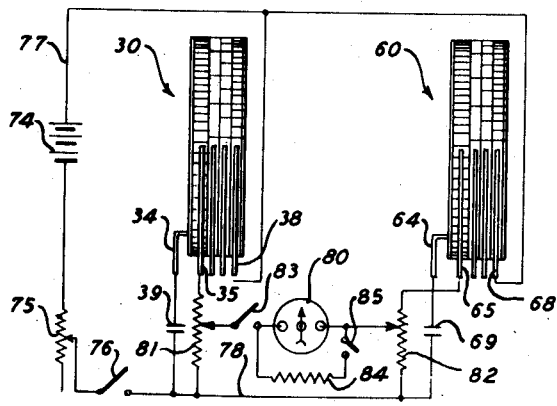
INVENTOR
A. J. N. DUCLOS
BY
E. R. Nowlan
ATTORNEY

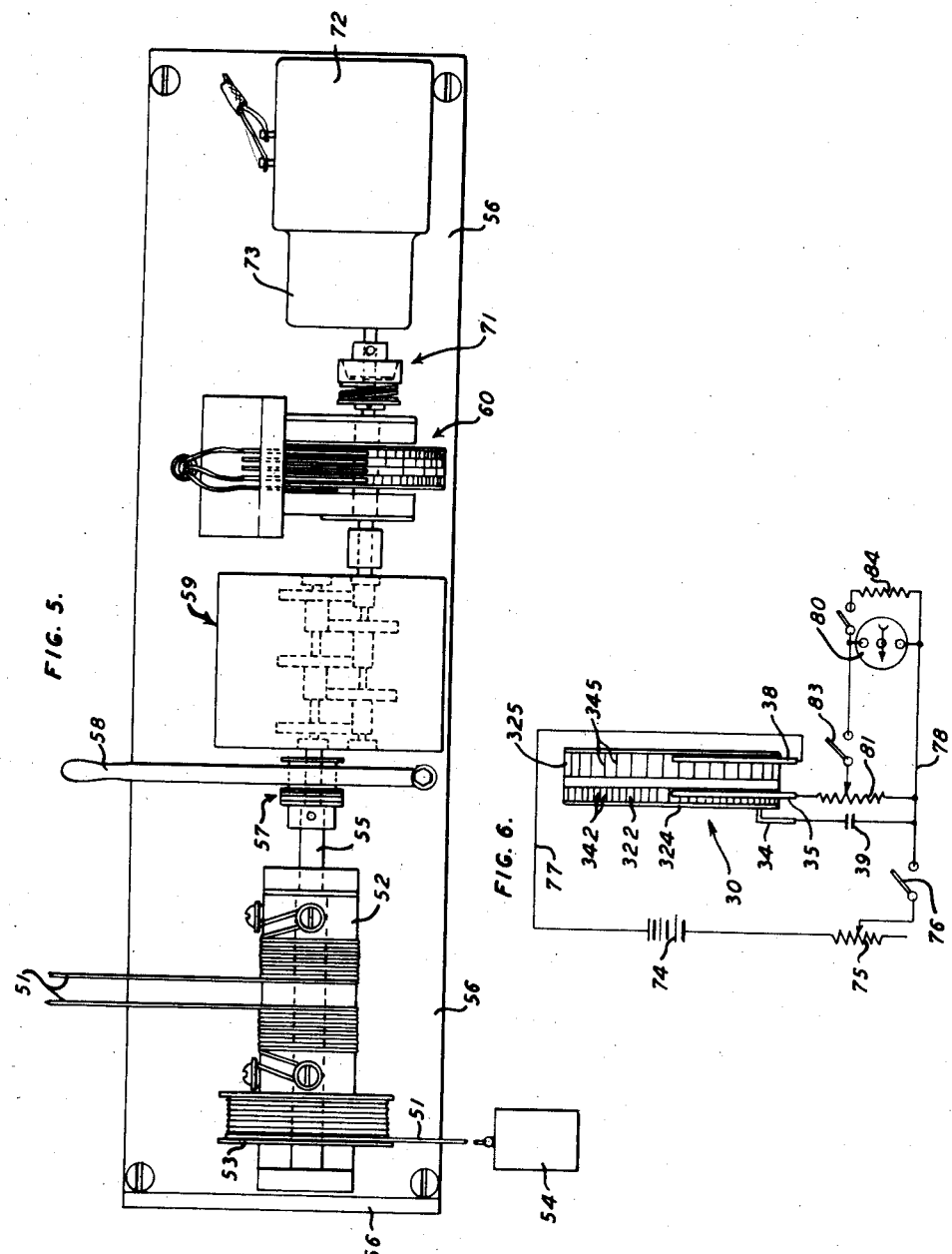

Patented Apr. 2, 1940

2,195,562

UNITED STATES PATENT OFFICE 2,195,562

SPEED INDICATING APPARATUS

Aeneas J. N. Duclos, South Orange, N. J., assignor to Western Electric Company, Incorporated, New York, N. Y., a corporation of New York Application November 5, 1937, Serial No. 172,980

4 Claims. (Cl. 235—103.5)

This invention relates to speed indicating apparatus and more particularly to apparatus for measuring the speeds of moving elements and for comparing the relative speeds of two such.

There are innumerable situations, particularly in connection with many different kinds of machines, in which it is desirable to measure absolutely or to detect variations in the speed of a moving element. Also there are cases where the constancy of the ratio of the speeds of two elements may be of interest. There have been tachometers devised in great variety for these and analogous purposes. Considerable difficulty, however, in the design and operation of such devices is encountered where the speed to be measured is unusually high or unusually low, or where the two speeds to be compared and whose ratio is of interest, are widely apart in value.

An instance of the desirability of such a device is to be found in the art of extruding a seamless sheath of lead or lead alloy or the like over a cable core comprising a plurality of insulated electrical conductors, such as are much used in the communications arts. In this case the core is led through an extrusion press and emerges sheathed with the metal. Aside from the sizes of the core and the extrusion die of the press, the thickness of the sheath will be primarily measured by the ratio of the speed of the press ram or cylinder to the speed of the extruded product, although it is also dependent upon other factors, such as the temperature and viscosity of the charge in the press cylinder. Also, if the speed of the press ram or cylinder be constant, the sheath thickness will be measured directly by the speed of the extruded product alone.

An object of the present invention is to produce a device or apparatus for measuring the speed of a moving element, or for comparing the speeds of two such elements, which shall be simple in construction and accurate and reliable in operation, particularly in the case of unusually high or low speeds, or in the case of two speeds markedly different in value.

With the above and other objects in view one embodiment of the invention contemplates means to measure the speed of a moving element comprising a source of electrical current, a current modifying means interposed in a circuit from the source, means to connect the modifying means mechanically to a moving element to be driven thereby to modify the current in cyclical repetition of frequency proportional to the speed of the element, and means to indicate the frequency.

Other objects and features of the invention will appear from the following detailed description of embodiments thereof taken in connection with the accompanying drawings in which the same reference numerals are applied to identical parts in the several figures and in which Fig. 1 is a broken diagrammatic view in front elevation of an extrusion press for sheathing cable with a device applied thereto for detecting and signalling variations in the ratio of the speed of the press cylinder to the speed of the extruded product, the device being constructed in accordance with the invention;

Fig. 2 is an enlarged sectional view of the product of the press of Fig. 1;

Fig. 3 is a detached, broken enlarged view of one of the interrupters of the device;

Fig. 4 is a wiring diagram of the showing of Fig. 1;

Fig. 5 is an enlarged view on the line 4—4 of Fig. 1, and

Fig. 6 is a diagram of a simple tachometer constructed in accordance with the invention.

In the embodiment disclosed in Figs. 1 to 5, inclusive, an extrusion press of any well known and appropriate construction has a movable extrusion cylinder 20 mounted on the hydraulic ram 21 of the press to be raised by the action of the hydraulic ram against a fixed extrusion ram 22 adapted to enter the cylinder 20. A cable core 24 enters the extrusion cylinder transversely from behind and emerges in front, as shown, ensheathed in a seamless sheath 25 of suitable material formed on the core by the action of the press.

The sheathed cable leaving the press passes over a supporting sheave 23 and under a friction roller 26, the latter being driven in rotation at a rotary speed directly proportional to the linear speed of the cable.

The roller 26 is directly connected to an electrical interrupter generally indicated at 30 and best shown in Fig. 3. It is to be noted that this interrupter 30 is light in weight and is driven directly from the moving cable by the friction roller 26 without any interposed reduction gearing or other massive or friction producing mechanism. Hence the interrupter follows the motion of the cable accurately and the friction roller does not need to press heavily against the newly formed and often still soft sheath.

Turning now to Figs. 1 and 5 particularly, a driving cord, chain or the like, 51, is attached in any convenient manner to the movable extrusion cylinder 20 and passes various times around a roller 52 and a sheave 53 mounted on the roller as shown in detail in Fig. 5. A weight 54 is secured to the free hanging end of the cord. The roller 52 is rigidly mounted on a shaft 55 journalled in any suitable support 56 and connected through a clutch 57, operable by a lever 58, to one end of a reduction gear chain generally indicated at 59 and of any suitable construction. The other end of the gearing 59 is connected to an interrupter, generally indicated at 60 and ordinarily identical in structure to the interrupter 30. At its other side the interrupter 60 is coupled through a slip clutch, generally indicated at 71 and of any appropriate construction, to a booster motor 72. If necessary, a speed reducing device 73, of any appropriate construction, may be interposed between the motor 72 and the interrupter 60. With this mechanism it is possible to rotate the interrupter 60 at a speed similar to the speed of rotation of the interrupter 30 but under the control of the extrusion cylinder 20. The booster motor 72 will rotate the interrupter 60 as fast as possible, but the rotary speed thereof is limited by the reduction gear chain 59 which is limited by the roller 52, and the rotation of the roller 52 is limited by its connection through the driving cord 51 to the extrusion cylinder. In other words, as the extrusion cylinder moves upwardly the driving cord withdrawn from the roller 52 causes rotation of the roller, the shaft 55, and through the clutch 57, the reduction gear chain 59. The interrupter 60 is rotated by the booster motor at a rate of speed governed by the speed of rotation of the connection of the interrupter with the reduction gear chain.

Returning now to Fig. 3, the interrupter 30 has a supporting shaft 31 journalled in any suitable way. A plurality (here shown as 4) of circular discs, 322, 323, 324 and 325, of insulating material is rigidly mounted on the shaft 31 together with a pair of external metal discs 321 and 326. The whole set of six discs is rigidly bound together by metallic fastenings 33, which also connect the discs 321 and 326 electrically.

A series of metallic contact bars 343, equispaced around the periphery of the discs 323, 324 and 325, extends across and is inlaid in the peripheral surfaces of these discs to lie parallel to the common axis of the discs and of the shaft 31. All of the contact bars 343 are integral with or are electrically joined to the metal exterior disc 326. A second series of similar contact bars 344 is set into and extends across only the peripheral surfaces of the discs 324 and 325; and a third series of bars 345 is similarly inlaid into the peripheral surface of the disc 325, the bars 344 and 345 being also electrically integral with the metal disc 326. Each bar 344 lies midway between a pair of consecutive bars 343, and each bar 345 lies midway between a bar 343 and an adjacent bar 344. Thus there are twice as many bars 343 and bars 344 across the disc 324, and four times as many bars 343, 344 and 345 across the disc 325, as there are bars 343 across the disc 323.

A series of bars 342 is similarly inlaid into and across the peripheral surface of the disc 322 only, and is electrically integral with the exterior metal disc 321. Each bar 342 lies midway between the imaginary extensions of a bar 345 and a bar 344 or a bar 343.

A sliding contact 34 is mounted to rub over the face of the disc 321, another sliding contact 35 rides on the peripheral surface of the disc 322 and hence also on the bars 342. Other similar contacts 36, 37 and 38 ride respectively on the peripheral surfaces of the discs 323, 324 and 325. Thus the contact 36 rides also on the bars 343 only, the contact 37 on the bars 343 and 344, and the contact 38 on the bars 343, 344 and 345.

The interrupter 60 may be thought of as identical in structure with the interrupter 30 as just described, and so will not be here described in detail. Reference numerals needed in discussing the interrupter 60 will be identical with those applied to interrupter 30 except that the first digit will be 6 instead of 3.

Now considering Fig. 4 particularly, the contacts 38 and 68 are connected in parallel through a line 77 to one side of a source 74 of direct electric current. The other side of the source is connected through a variable resistance 75, an operating switch 76 and a line 78, in parallel, to a pair of preferably electrically identical condensers 39 and 69, which are then connected respectively to the contacts 34 and 64. Contacts 35 and 65 are connected in parallel through rheostat resistances 81 and 82 respectively to the line 78. A microammeter 80, or other suitable indicating means, is bridged through a switch 83 across the variable contacts of the rheostats 81 and 82. If desired a safety resistance 84 may be shunted around the meter 80, as shown, through a switch 85 for use when setting up or adjusting the apparatus.

In operation, assuming that the press is functioning, that the extrusion cylinder 20 is moving up, and that sheathed cable is coming out of the press under the roller 26, the switches 76 and 83 are closed and the switch 85 is open. The visible face of the rotary parts in Fig. 3 is then moving up. Contacts 36 and 37 are idle and these, together with discs 323 and 324 may be disregarded, or thought of as omitted for the present. Contact 35 has just left a bar 342 and rests on the insulating disc 322. Contact 38 rests on the insulating disc 325. Condensers 39 and 69 are discharged, having just been short circuited through the resistance 81 by the contact 34, plate 321, bar 342, and contact 35.

A moment later, the contact 38 comes on a bar 345. A circuit is thus established from the line 77 through contact 38, bar 345, plate 326, fastenings 33, plate 321, contact 34, and condenser 39 to the line 78, thus charging the condenser. Contact 38 leaves the bar 345 and a moment later the contact 35 comes on a bar 342 and the condenser is discharged through the resistance 81 as before. Thus a pulsating direct current, due to the repeated discharging of the condenser 39 through the resistance 81, is caused to flow through the resistance 81. The frequency of these successive identical pulses and hence the integrated magnitude of the pulsating current, is proportional to the rotary speed of the discs 322 and 325 and therefor to the linear speed of the cable under the roller 26.

At the same time and in the same fashion, the interrupter 60, driven by the extrusion cylinder 20 in the manner described, causes a pulsating direct current to flow through the resistance 82, by repeatedly charging and discharging the condenser 69. The microammeter 80 may then be used to detect and measure any unbalance of the integrated currents through the resistance 81 and 82. Since these currents are proportional to the speeds of the cable and of the cylinder respectively, any unbalance of the currents will represent and measure a corresponding unbalance of the two speeds in question. It is only necessary that the speeds of the discs of the devices 30 and 60, i. e., the frequency of the pulsating currents caused by these devices, be sufficiently great to allow the mechanical inertia of the meter 80 to integrate the currents. In one embodiment of the invention as described, it was found that a current frequency in resistances 81 and 82 of upwards of 30 per second was sufficient, and enabled detection and measurement of changes in the ratio of the two speeds of the order of one percent.

When the press has come to the end of its working stroke and is to be reversed, operation of the lever 58 to open the clutch 57, allows the cylinder 20 to return to its charging position without driving the gears 59 and the interrupter 60 in the reverse direction.

Inasmuch as a single press may be used at different times for a large variety of cable sizes and sheath thicknesses, the optimum ratio of cable speed to cylinder speed may be widely different in different cases. Hence the interrupters 30 and 60 are provided with the additional discs 324 and 323 with their fewer and more widely spaced charging contacts 344 and 345.

Reduced to its lowest terms, the invention is shown diagrammatically in Fig. 6 embodied in a simple tachometer for measuring a single speed, in which it is intended that the interrupter 30 will be driven in any suitable manner by the member whose speed is to be measured.

Although the invention is herein shown in a principal embodiment as applied in apparatus for detecting and measuring a change in the ratio of the speeds of two elements pertaining to cable sheath extrusion, it is by no means limited to such application, but is applicable wherever the speed of a moving element is to be measured, as disclosed in Fig. 6, as well as where the speeds of two elements are to be compared.

The embodiments herein disclosed are merely illustrative and may be modified and departed from in many ways without departing from the spirit and scope of the invention as pointed out in and limited solely by the appended claims.

What is claimed is:

1. In a speed indicating apparatus, means for detecting variations in the ratio of speeds of two parts movable normally at different speeds, said means comprising a source of electrical current, two condensers connected thereto in parallel, two interrupters to be driven independently and respectively by the two parts and interposed between the source and the two condensers, respectively, and operating to charge the two condensers, respectively, independently and intermittently at predetermined intervals, means associated with at least one of the interrupters to vary the operating charge intervals thereof relative to the speed of its associated moving part, a discharge circuit for each condenser, means to balance the pulsating intermittent discharge currents of the two condensers against each other, and means in the current balancing means to detect a variation in the ratio of the measure of an electrical characteristic of one current to the measure of the electrical characteristic of the other current.

2. In a speed indicating apparatus, means for detecting variations in the ratio of speeds of two parts movable normally at different speeds, said means comprising a source of electrical current, two condensers connected thereto in parallel, two interrupters to be driven independently and respectively by the two parts and interposed between the source and the two condensers, respectively, and operating to charge the two condensers, respectively, independently and intermittently at predetermined intervals, means associated with at least one of the interrupters to vary the operating charge intervals thereof comparable to the speed of its associated moving part, means interposed between one of the parts and the interrupter associated therewith to cause variations in the relative speeds thereof to normally cause the said interrupter to be driven at a predetermined speed relative to the other interrupter, a discharge circuit for each condenser, means to balance the pulsating intermittent discharge currents of the two condensers against each other, and means in the current balancing means to detect a variation in the ratio of the measure of an electrical characteristic of one current to the measure of the electrical characteristic of the other current.

3. In a speed indicating apparatus, means for detecting variations in the ratio of speeds of two parts movable normally at different speeds, said means comprising a source of electrical current, two condensers connected thereto in parallel, two interrupters to be driven independently and respectively by the two parts and interposed between the source and the two condensers, respectively, and operating to charge the two condensers, respectively, independently and intermittently at predetermined intervals, each interrupter having selective means to vary the operating charge intervals thereof comparable to the speed of its associated part, a discharge circuit for each condenser, means to balance the pulsating intermittent discharge currents of the two condensers against each other, and means in the current balancing means to detect a variation in the ratio of the measure of an electrical characteristic of one current to the measure of the electrical characteristic of the other current.

4. In a speed indicating apparatus, means for detecting variations in the speed of a moving part comprising a source of electrical current, a condenser connected thereto, an interrupter to be driven by the moving part having groups of variably spaced contacts selectively interposed between the source and the condenser to charge the condenser at intermittent intervals from the source, means associated with the groups of contacts to selectively vary the intermittent intervals comparable to the speed of the part, a discharge circuit for the condenser, and means to measure an electrical characteristic of current in the discharge circuit.

AENEAS J. N. DUCLOS.